(12) United States Patent
Salls

(10) Patent No.: US 6,401,420 B1
(45) Date of Patent: Jun. 11, 2002

(54) TIRE RECYCLING/DISPOSAL SYSTEM AND TIRE RECYCLING/DISPOSAL ANNULET CYLINDER OR CONSTRUCTION BLOCK

(76) Inventor: Darwin Aldis Salls, P.O. Box 770126, Ocala, FL (US) 34477-0126

( * ) Notice: Subject to any disclaimer, the term of this patent is extended or adjusted under 35 U.S.C. 154(b) by 0 days.

(21) Appl. No.: 08/977,527

(22) Filed: Nov. 24, 1997

(51) Int. Cl.$^7$ .................................................. E02B 3/06
(52) U.S. Cl. ...................... 52/600; 52/606; 52/DIG. 9; 249/91; 264/275; 405/21
(58) Field of Search .............................. 52/DIG. 9, 600, 52/606; 264/912, 275; 425/117; 249/91; 405/15, 21

(56) References Cited

U.S. PATENT DOCUMENTS

| | | | | | |
|---|---|---|---|---|---|
| 3,713,760 A | * | 1/1973 | Hemphill | .................... | 425/117 |
| 5,013,509 A | * | 5/1991 | Kiselewski | ................. | 264/912 |
| 5,172,528 A | * | 12/1992 | Clarke | .................... | 52/DIG. 9 |
| 5,214,897 A | * | 6/1993 | Nordberg | ................. | 52/DIG. 9 |
| 5,372,451 A | * | 12/1994 | Stewart | .................... | 52/DIG. 9 |
| 5,645,371 A | * | 7/1997 | Marzullo | ................. | 52/DIG. 9 |
| 5,778,622 A | * | 7/1998 | Baker | ...................... | 52/DIG. 9 |

* cited by examiner

Primary Examiner—Robert Davis

(57) ABSTRACT

A method and means for making and using three composite concrete construction components that share a common matrix. The articles are comprised of: discarded whole tires 2, axially aligned, with rebar formed washers 4, transversely placed at intervals between the tires 2. The tire bundle 2, with the washers 4, are compressed, banded with metal or fiber strapping 1, reinforced with wire mesh 5, and rebar rods 6, and encased in a concrete shell 3, to form: cylinders; rectangular-blocks; or, half blocks. The concrete composite articles can be molded with hollow cores and used individually or in multiple configurations to construct environmentally safe structures such as: artificial reefs, beach erosion inhibitors, jetties and artificial islands; imbricated walls for: highway dividers, noise abatement, retaining and security walls around airports and buildings. These composite concrete articles will allow for millions of discarded tires to be recycled into non-polluting, environmentally friendly structures for use in virtually any construction project.

13 Claims, 8 Drawing Sheets

9  12

10  13

11  14

15  16

TIRE RECYCLING/DISPOSAL SYSTEM AND TIRE RECYCLING/DISPOSAL ANNULET CYLINDER OR CONSTRUCTION BLOCK

STATEMENT REGARDING FEDERALLY SPONSORED RESEARCH OR DEVELOPEMENT

Applicant has not received any federally sponsored research or development assistance.

REFERENCE TO A MICROFICHE APPENDIX

Applicant does not have a microfiche appendix.

BACKGROUND OF THE INVENTION

1. Field of the Invention

Applicant's invention relates to manufacturing, composition of matter, recycling, and new use fields; particularly to concrete construction components, the method to mold the components, and the use of the components to build structures, to: combat coastal erosion, build jetties, dikes, reefs, foundation stabilizing supports, sound abatement dividers for highways and airports, and other marine and land applications.

2. Description of Related Art

There are many structures built using discarded tires as components—some tires are embedded in concrete for various uses as erosion control and for building walls. Most of these uses are inefficient, environmentally disruptive, time consuming to construct, and usually have design flaws and little or no commercial value.

BRIEF SUMMARY OF THE INVENTION

A method and means for using three common concrete construction components: a cylinder, a rectangular block, and a half block. The structures share a common matrix, comprising: two or more whole tires; rebar formed washers formed from rebar rods welded in a spider-like fashion to two different diameter rebar formed rings, wherein the washers are inserted transversely between the tires and at each end of the tire bundle; reinforcement wire is attached to the inner and outer surfaces of the tire bundle, and secured to the washers; reinforcement rods are laterally placed on the inner and outer surfaces of the tire bundle and also secured to the washers. The reinforced tire bundle is placed into a mold after compression, and an appropriate concrete mix is poured or injected and let cure. If additional. strength is needed, the center, usually hollow, can be filled with concrete and additional reinforcement.

These concrete construction components provide the industry with viable alternatives to expensive, time consuming, and pollutant-type tire recycling methods in existence today. These components provide the industry with encased tire matrix components for: noise abatement walls, for the sound absorbing qualities of the encased tires; beach erosion inhibitors; artificial reefs and jetty construction for the non-pollutant, environmentally friendly concrete components; levee construction or reconstruction, flood control structures, for the strength and durability of the components. Further objects and advantages of Applicant's concrete construction components will become apparent from a consideration of the drawings and ensuing descriptions.

1. Elements of the Components:
   Metal or Fiber Strapping . . . 1
   Whole Tires . . . 2
   Concrete Mix . . . 3
   Spider Washers . . . 4
   Foundation Reinforcement Wire . . . 5
   Rebar Linear Rods . . . 6

DETAILED DESCRIPTION OF THE INVENTION

Figure 1:
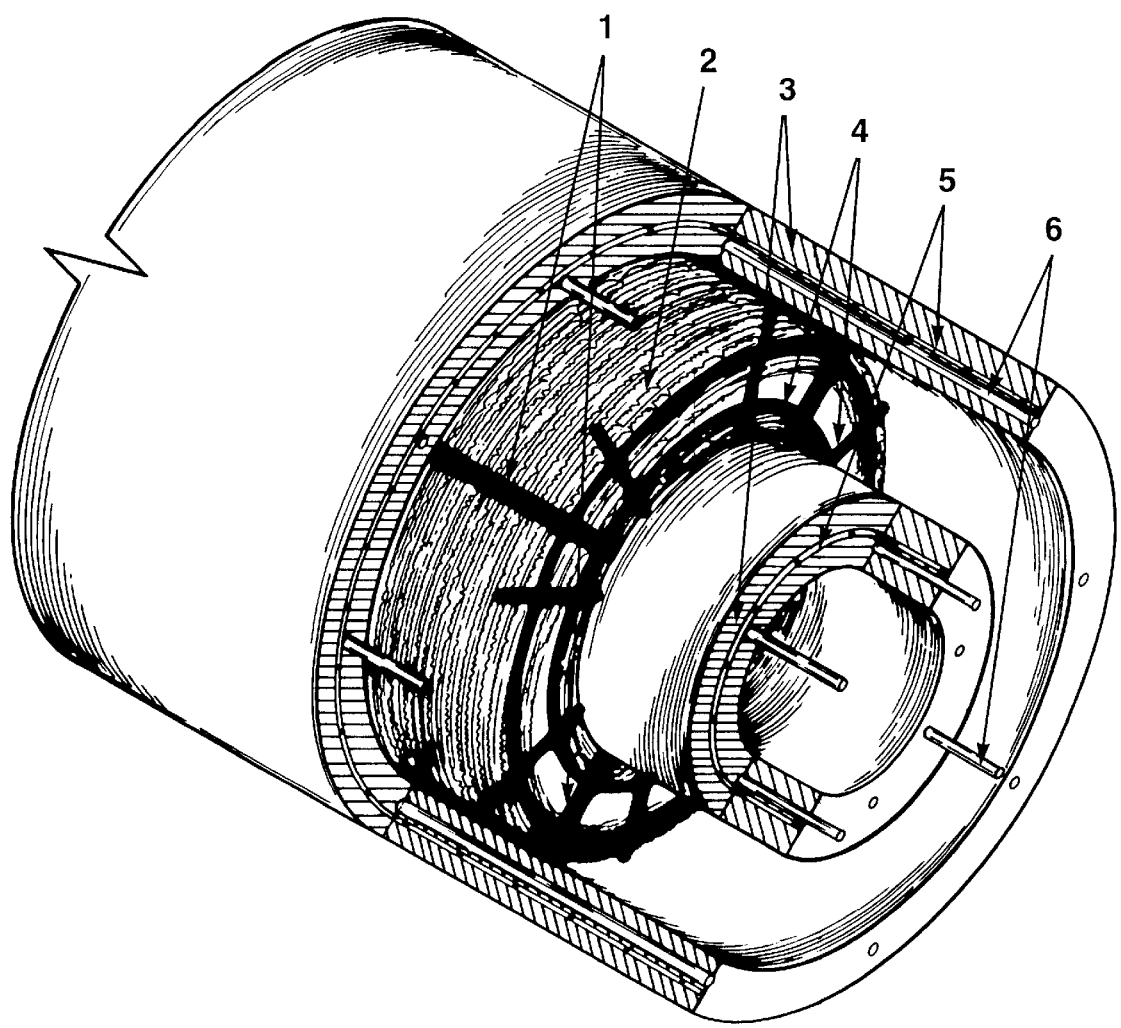
FIG. 1: A cutaway perspective view of an annulet cylinder.

FIG. 1: A cutaway perspective view of an annulet cylinder. The exposed matrix consists of: metal or fiber strapping 1, which bind whole tires 2. Spider Washers 4, are multiple legged rebar formed washers, wherein two different diameter rebar formed rings form a base in which multiple rebar rods, eighteen to twenty-two inches, are welded. Whole tires 2, have transverse mounted spider washers 4, at predetermined intervals and at each end of the tire bundle. The tire bundle 2, is hydraulically pressed and bound by two or more metal or fiber straps 1, to keep the tire bundle 2, compressed. Foundation wire mesh 5, and linear rods 6, are used on the inside and outside of the tire bundle 2, to reinforce and strengthen the matrix. The entire matrix is encased in a form and a concrete mixture 3, added, to form an annulet cylinder.

Figure 2:
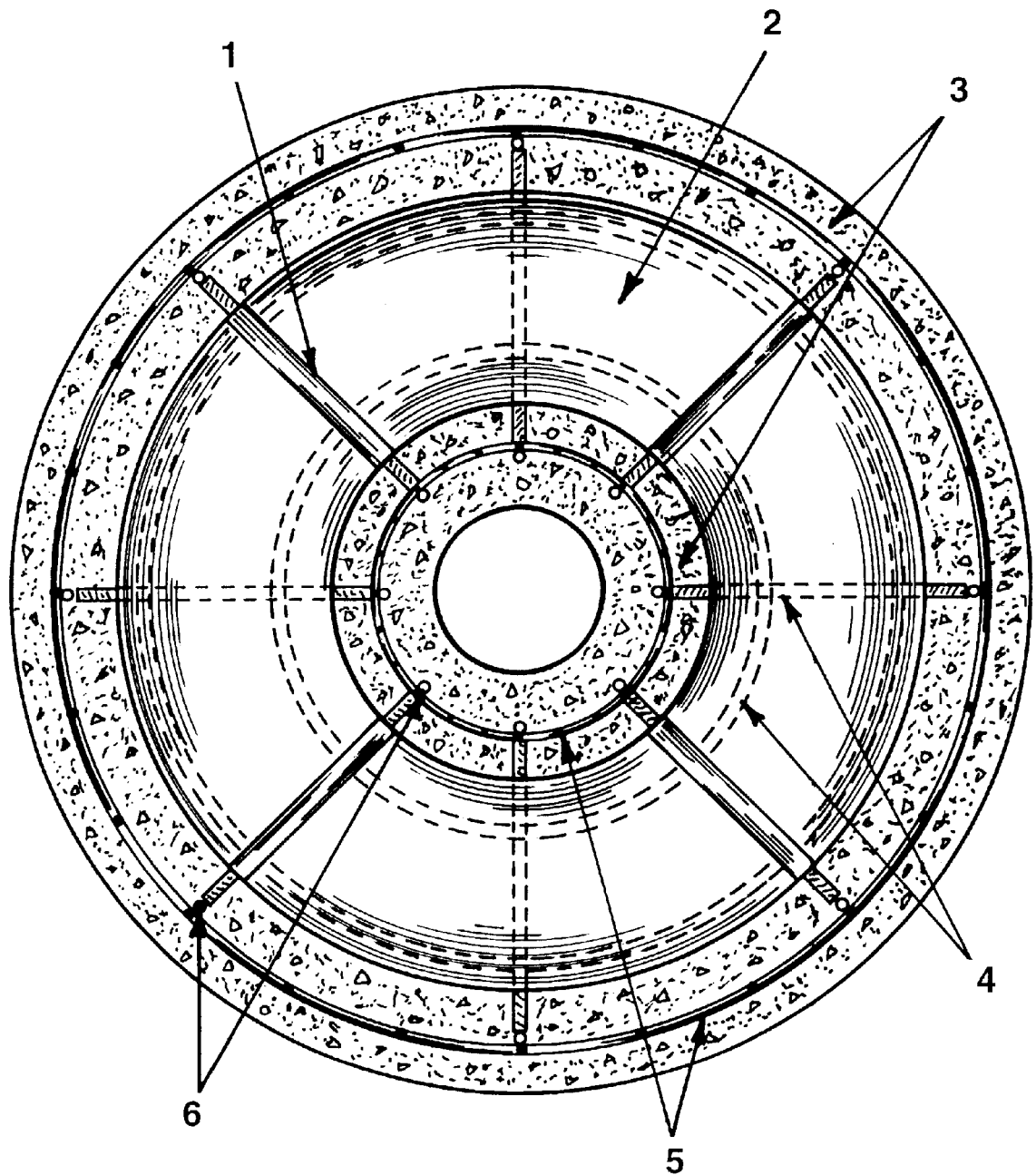
FIG. 2: A sectional view of an annulet cylinder.

FIG. 2: A sectional view of an annulet cylinder which details the cylinder matrix. The figure shows the metal or fiber strapping 1, binding whole tires 2, and the spider washers 4. Foundation wire 5, and linear rebar rods 6, are placed next to the inner and outer ends of the spider washers 4. This example shows a concrete mix 3, on the outside and inside of the cylinder. The core of this example can be poured solid with a concrete mix 3, for extra strength applications, such as jetty construction.

Figure 3:
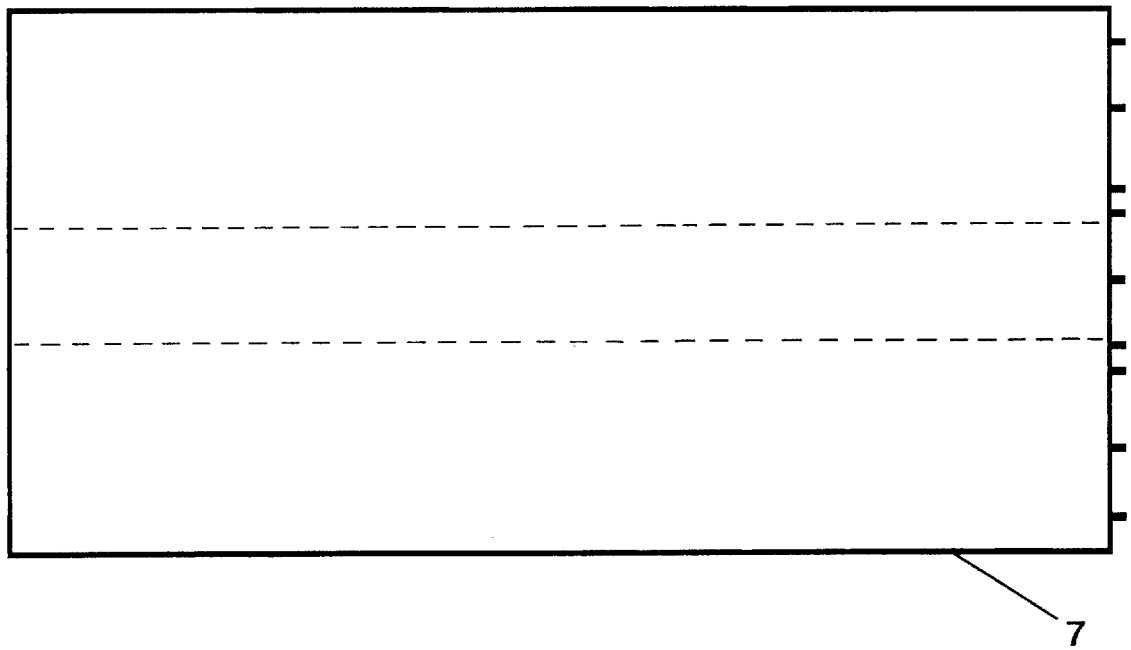
FIG. 3: A side view and end view of an annulet cylinder.
Figure 3:
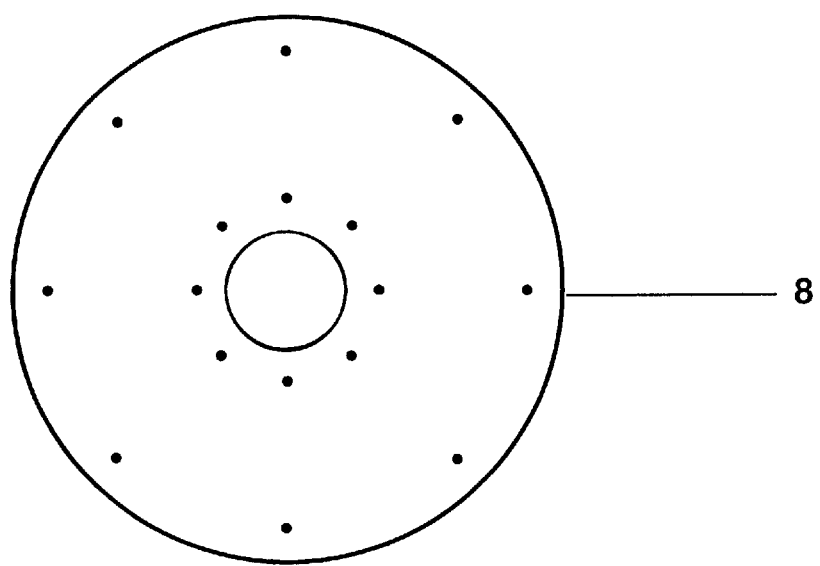

FIG. 3: An annulet cylinder side view 7, and end view 8, wherein the rebar rods 6, have been exposed. The exposed rebar rods 6, would be sealed in concrete 3, prior to any application.

Figure 4:
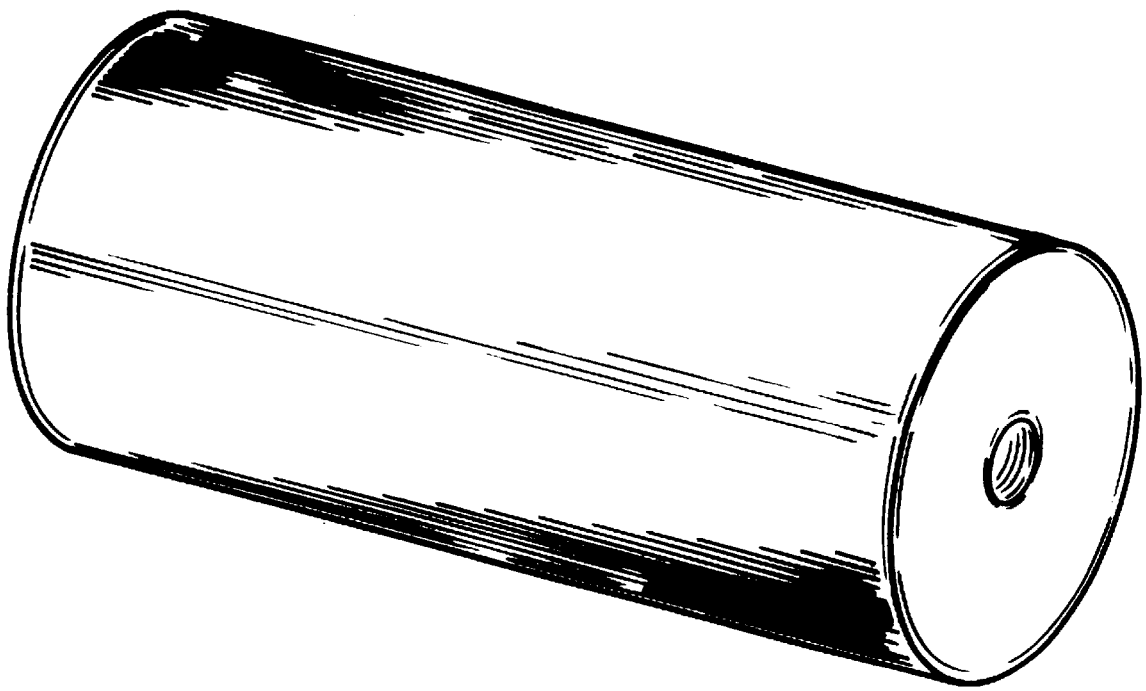
FIG. 4: A perspective view of an annulet cylinder.

FIG. 4: A perspective view of an annulet cylinder 9, in which all of the elements have been encased, for individual uses as foundation supports, culverts, and reef components.

Figure 5:
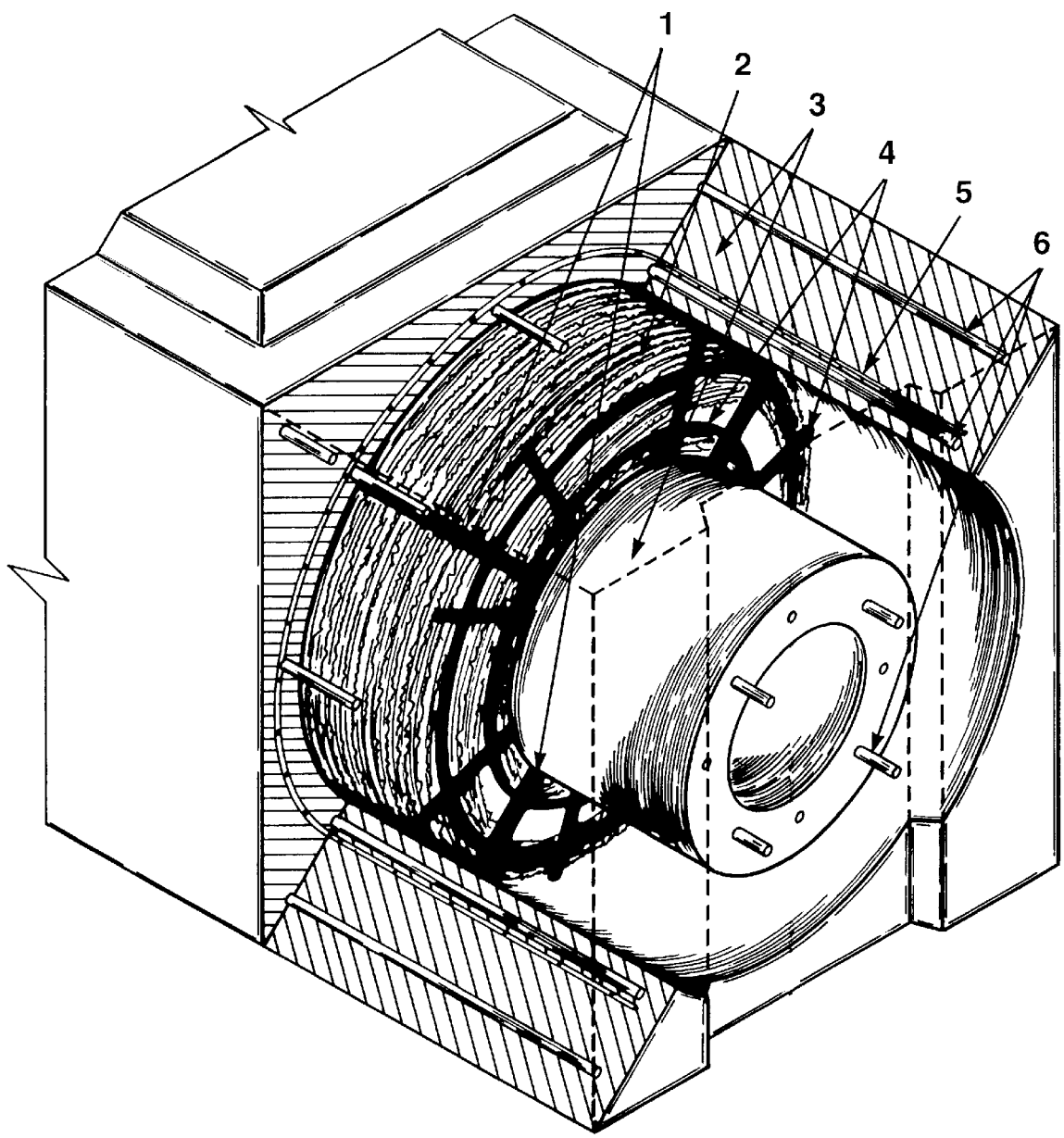
FIG. 5: A cutaway perspective view of a rectangular construction block.

FIG. 5: A cutaway perspective view of a rectangular construction block. The exposed matrix consists of: metal or fiber strapping 1, which binds whole tires 2. Spider washers 4, are positioned at intervals transversely in the tire bundle 2, and at each end. The tire bundle 2, is hydraulically pressed and bound by two or more metal or fiber straps 1. Foundation wire mesh 5, and linear rebar rods 6, are used on the inner and outer sides of the tire bundle 2, to reinforce and strengthen the matrix. The entire matrix is placed into a form and a concrete mix 3, is added, to form a block unit. The inside of the form has two recessed beveled edge squares on the top and two raised beveled edge squares on the bottom, which form the described rectangular construction block. One end of the rectangular block form has a recessed longitudinal groove, and the opposite end has an equally dimensioned raised longitudinal extension in order for multiple blocks to be tied together. The half block can be cast in the same form as the rectangular block by using a petition transversely in the middle of the form.

Figure 6:
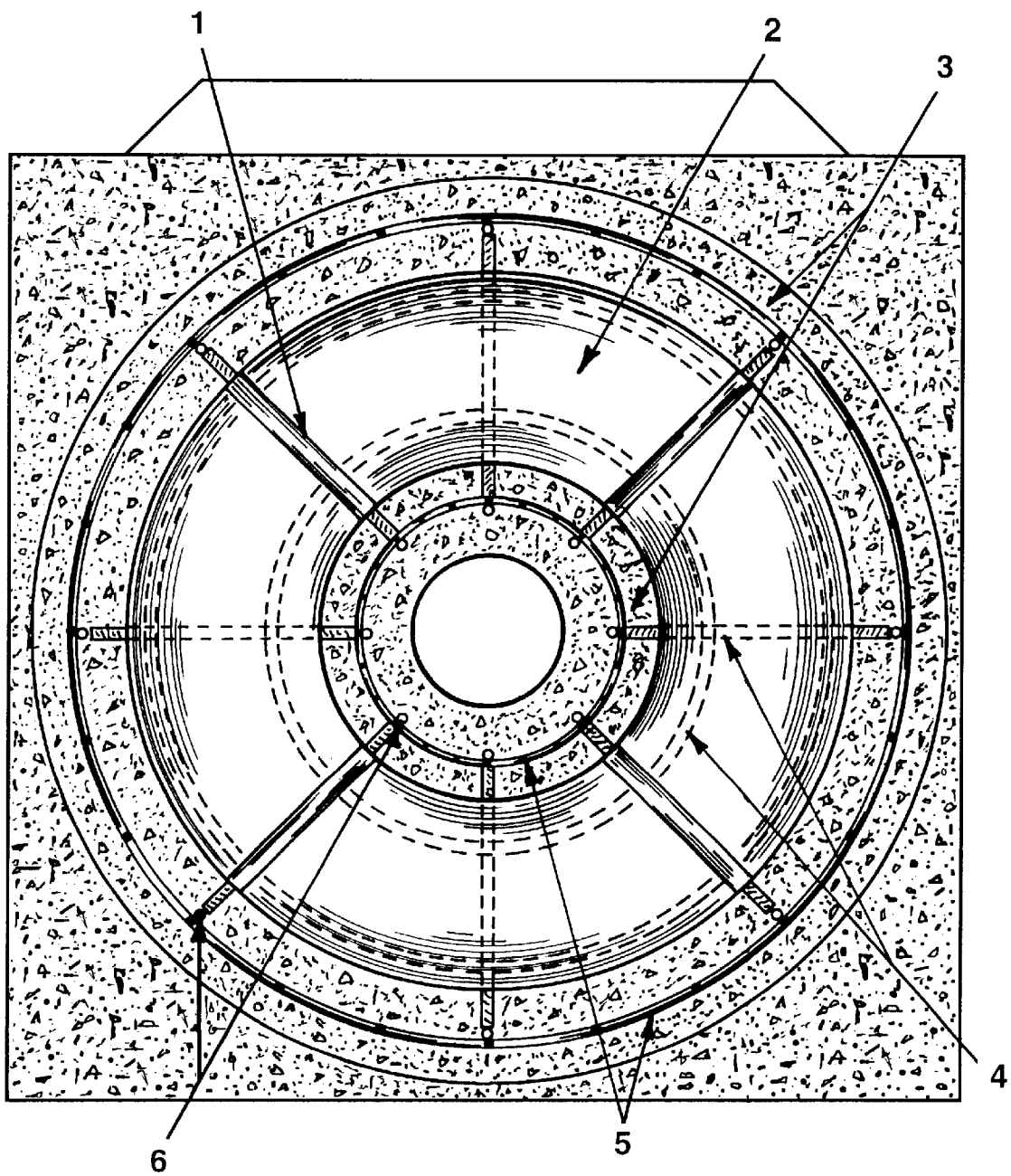
FIG. 6: A sectional view of a construction block.

FIG. 6: A sectional view of a construction block which details the block matrix. The figure shows the metal or fiber strapping 1, which binds the whole tires 2, spider washers 4, foundation wire mesh 5, and linear rebar rods 6, which are attached to the inner and outer ends of the spider washers 4. This example shows a concrete mix 3, on the inner and outer areas of the block, leaving a hollow core. Additional linear rods 6, can be placed into the hollow core of the block and poured solid with a concrete mix 3, for extra strength and to attach blocks together laterally.

Figure 7:
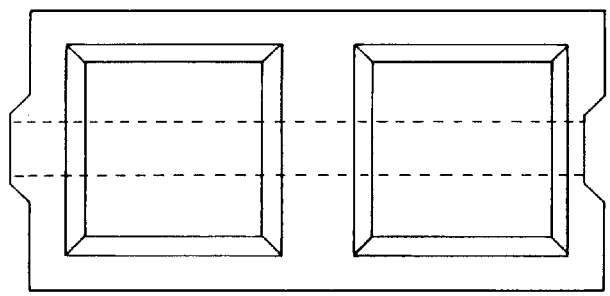
FIG. 7: Elevation views of a construction block.
Figure 7:
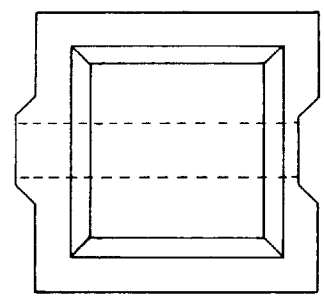
Figure 7:
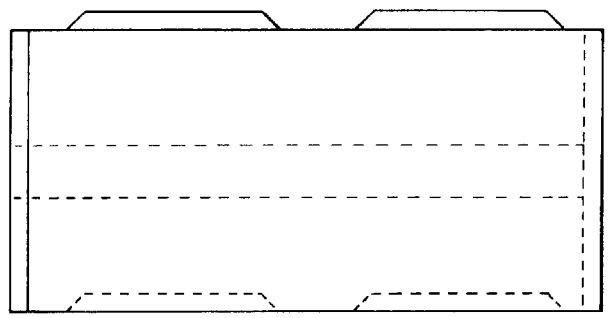
Figure 7:
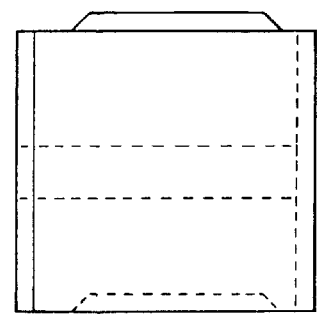
Figure 7:
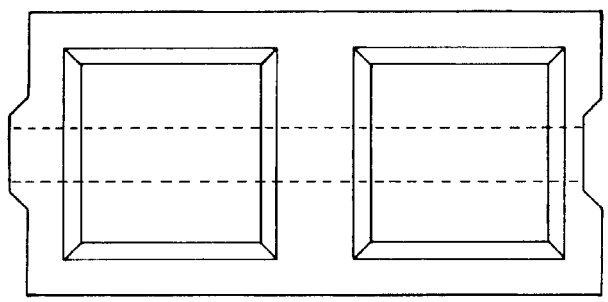
Figure 7:
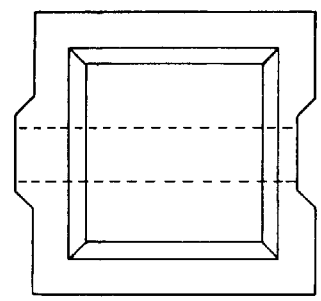
Figure 7:
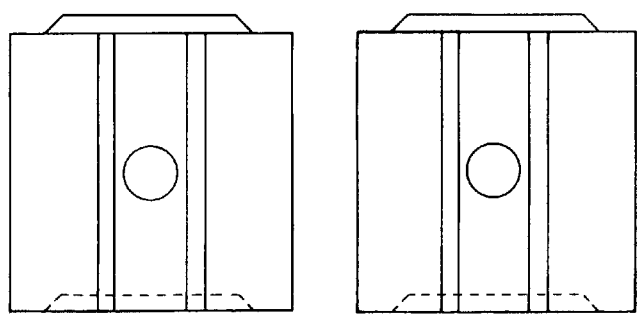

FIG. 7: Elevations of the rectangular construction block and half block. Example 9, is a top or bottom elevation of the rectangular block with a hollow core. Example 10, is a side elevation of the rectangular block with a hollow core; one recessed end; and two recessed beveled edge squares on the bottom. Example 11, is a top or bottom elevation with a hollow core. Example 12, is a top or bottom elevation of a half block with a hollow core. Example 13, is a side elevation of a half block with a hollow core; a recessed end; and a recessed beveled edge square on the bottom. Example 14, is a top or bottom elevation of a block or half block with a hollow core. Example 15, is an end elevation of a block/half block with a hollow core. Example 16, is the same elevation as example 15, and all elevations show the raised beveled edge square(s) on the tops and the recessed beveled edge square(s) on the bottoms.

Figure 8:
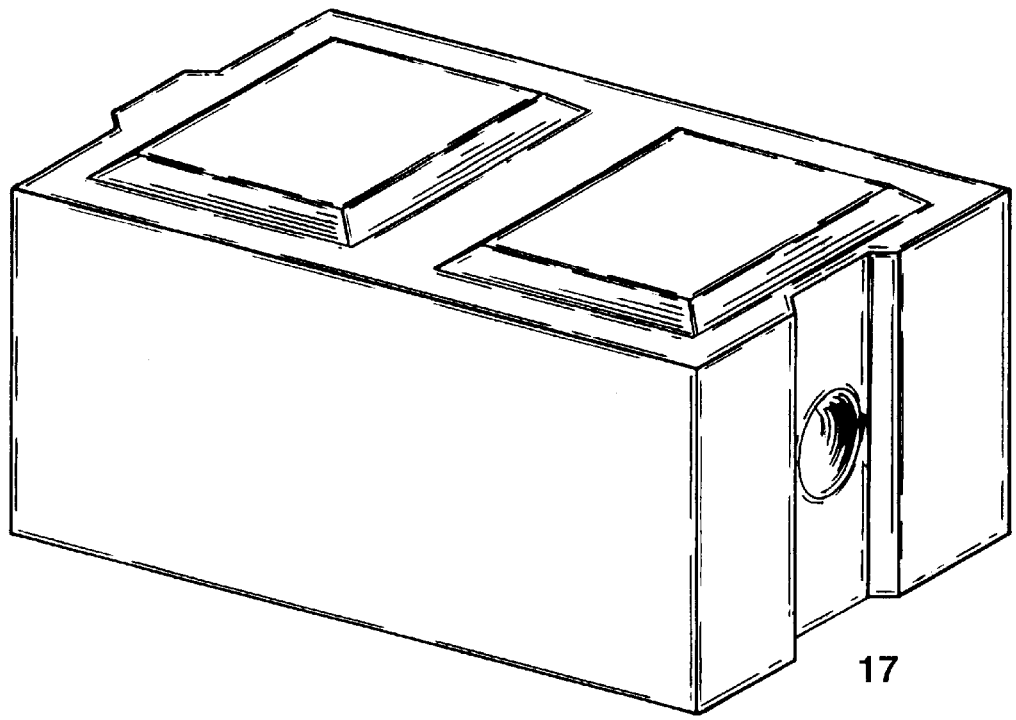
FIG. 8: Perspective views of a rectangular construction block and a half construction block.
Figure 8:
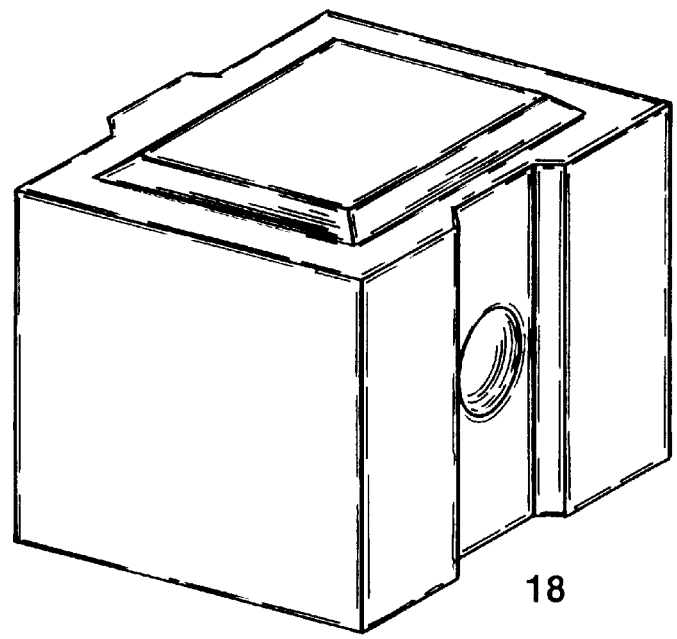

FIG. 8: Perspective views of the rectangular block 17, and the half block 18, with raised beveled edge square(s) on the tops and hollow cores.

What is claimed is:

1. A system for molding concrete articles with embedded whole tires, comprising: a rigid form for molding a concrete article, a tire bundle within said form, with a matrix consisting of: a plurality of compressed whole tires bound by metal or fiber strapping, several lengths of rebar rod placed on the inner and outer sides of the tire bundle, a spider washer arrangement of rebar rods integrated along the length of the tire bundle, and; a concrete mixture suitable for pouring into said mold to form a composite concrete article.

2. A system for molding concrete articles of claim 1, wherein said mold is in the form of a cylinder.

3. A system for molding concrete articles of claim 1, wherein said mold is in the form of a cylinder with a central hollow core.

4. A system for molding concrete articles of claim 1, wherein said mold is in the form of a rectangular block with two raised beveled edge squares of equal dimensions on the top, two recessed beveled edge squares of equal dimensions on the bottom, one end of said rectangular block mold having a recessed vertical groove extending from the top of said rectangular block mold, to the bottom of the block mold and a raised vertical extension of equal dimensions on the opposite end of the block mold.

5. A system for molding concrete articles of claim 4, wherein said mold has means to mold said rectangular block with a central hollow core.

6. A system for molding concrete articles of claim 4, wherein said mold has a petition means to mold a half block with one raised beveled edge square on the top, one recessed beveled edge square on the bottom, one end of said mold for said half block having a recessed vertical groove extending from the top of the half block mold to the bottom of the half block mold and a raised vertical extension of equal dimensions on the opposite end of the half block mold.

7. A system for molding concrete articles of claim 6, wherein said mold has means to form a half block with a central hollow core.

8. A modular cylinder suitable for use as a construction component, comprising:
   a. a plurality of whole tires with a plurality of spider washers integrated transversely between the tires, at predetermined intervals, wherein the tires and integrated plurality of spider washers are compressed to form an annular tire bundle, the spider washers having inner and outer ends;
   b. a plurality of metal or fiber strapping to bind the bundle;
   c. concrete wire mesh reinforcement attached by attachment means to the inner and outer ends of the spider washers;
   d. a plurality of rebar rods parallel to the annular tire bundle and attached by attachment means to the inner and outer ends of the spider washers; and
   e. a concrete shell which encases the annular tire bundle to form a composite concrete cylinder.

9. A modular composite concrete cylinder of claim 8, wherein said composite cylinder has a central hollow core.

10. A modular composite rectangular block for use as a construction component, comprising:
    a. a plurality of whole tires with a plurality of spider washers integrated transversely between the tires at predetermined intervals, wherein the tires and integrated plurality of spider washers are compressed to form an annular tire bundle, the spider washers having inner and outer ends;
    b. a plurality of metal or fiber strapping to bind the bundle;
    c. concrete wire mesh reinforcement attached by attachment means to the inner and outer ends of the spider washers;
    d. a plurality of rebar rods parallel to the annular tire bundle and attached by attachment means to the inner and outer ends of the spider washers; and
    e. a concrete shell which encases the annular tire bundle to form a composite concrete rectangular block, the rectangular block having two raised beveled edge squares of equal dimensions on the top, two recessed beveled edge squares of equal dimensions on the bottom, one end of said rectangular block having a recessed vertical groove extending from the top of the rectangular block to the bottom of the rectangular block and a raised vertical extension of equal dimensions on the opposite end of the rectangular block.

11. A modular rectangular block of claim 10, wherein said rectangular block as a central hollow core.

12. A modular composite half block for use as a construction component, comprising:
    a. a plurality of whole tires with a plurality of spider washers integrated transversely between the tires at predetermined intervals, wherein the tires and integrated plurality of spider washers are compressed to form an annular tire bundle, the spider washers having inner and outer ends;
    b. a plurality of metal or fiber strapping to bind the bundle;
    c. concrete wire mesh reinforcement attached by attachment means to the inner and outer ends of the spider washers;
    d. a plurality of rebar rods parallel to the annular tire bundle and attached by attachment means to the inner and outer ends of the spider washers; and e. a concrete shell which encases the annular tire bundle to form a composite concrete half block, the half block having one raised beveled edge square on the top, one recessed beveled edge square on the bottom, one end of said half block having a recessed vertical groove extending from the top of the half block to the bottom of the half block and a raised vertical extension of equal dimensions on the opposite end of the half block.

13. A modular half block of claim 12, wherein said half block has a central hollow core.